United States Patent
Glass et al.

(10) Patent No.: US 6,607,096 B2
(45) Date of Patent: Aug. 19, 2003

(54) VOLUMETRIC ICE DISPENSING AND MEASURING DEVICE

(75) Inventors: Greg A. Glass, Floyds Knobs, IN (US); David C. Hobson, Pekin, IN (US); Jerry L. Landers, Memphis, IN (US); Richard K. Renken, Chesterfield, MO (US)

(73) Assignee: Manitowoc Foodservice Companies, Inc., Manitowoc, WI (US)

( * ) Notice: Subject to any disclaimer, the term of this patent is extended or adjusted under 35 U.S.C. 154(b) by 0 days.

(21) Appl. No.: 09/931,196

(22) Filed: Aug. 15, 2001

(65) Prior Publication Data

US 2002/0020711 A1 Feb. 21, 2002

Related U.S. Application Data

(60) Provisional application No. 60/225,347, filed on Aug. 15, 2000.

(51) Int. Cl.[7] ................................................. B67D 5/30
(52) U.S. Cl. ............................. 222/1; 222/33; 222/14; 222/59; 222/414
(58) Field of Search ......................... 222/225, 14, 1, 222/146.6, 414, 55, 56, 33, 59

(56) References Cited

U.S. PATENT DOCUMENTS

| 3,081,910 | A | * | 3/1963 | Zedler, Jr. .................... 222/22 |
| 3,416,708 | A | * | 12/1968 | Davis .......................... 335/37 |
| 4,195,522 | A | * | 4/1980 | Anderson et al. ........ 73/861.79 |
| 4,386,640 | A | * | 6/1983 | Carr et al. .................. 141/361 |
| 4,496,087 | A | | 1/1985 | Marks |
| 4,517,651 | A | | 5/1985 | Kawasaki et al. |
| 4,590,975 | A | | 5/1986 | Credle, Jr. |
| 4,787,539 | A | | 11/1988 | Uchida et al. |
| 4,921,149 | A | | 5/1990 | Miller et al. |
| 5,058,773 | A | * | 10/1991 | Brill et al. ............... 222/129.4 |

* cited by examiner

Primary Examiner—Kevin Shaver
Assistant Examiner—Stephanie Willatt
(74) Attorney, Agent, or Firm—Brinks Hofer Gilson & Lione

(57) ABSTRACT

This invention relates to an apparatus and method for the volumetric measuring and dispensing of ice from a holding bin. The ice is desirably in a crushed or cubed state and is agitated during storage to prevent its freezing into a solid block. When a volume of ice is desired, a user activates the machine to dispense the desired amount. As the ice is dispensed, it rotates a wheel that provides a volumetric measurement and closes a door to the holding bin when the proper amount is dispensed.

23 Claims, 11 Drawing Sheets

Fig. 9 Ice Portion Adjustment

Ice Dispensing Sequence (continue to Fig. 11)

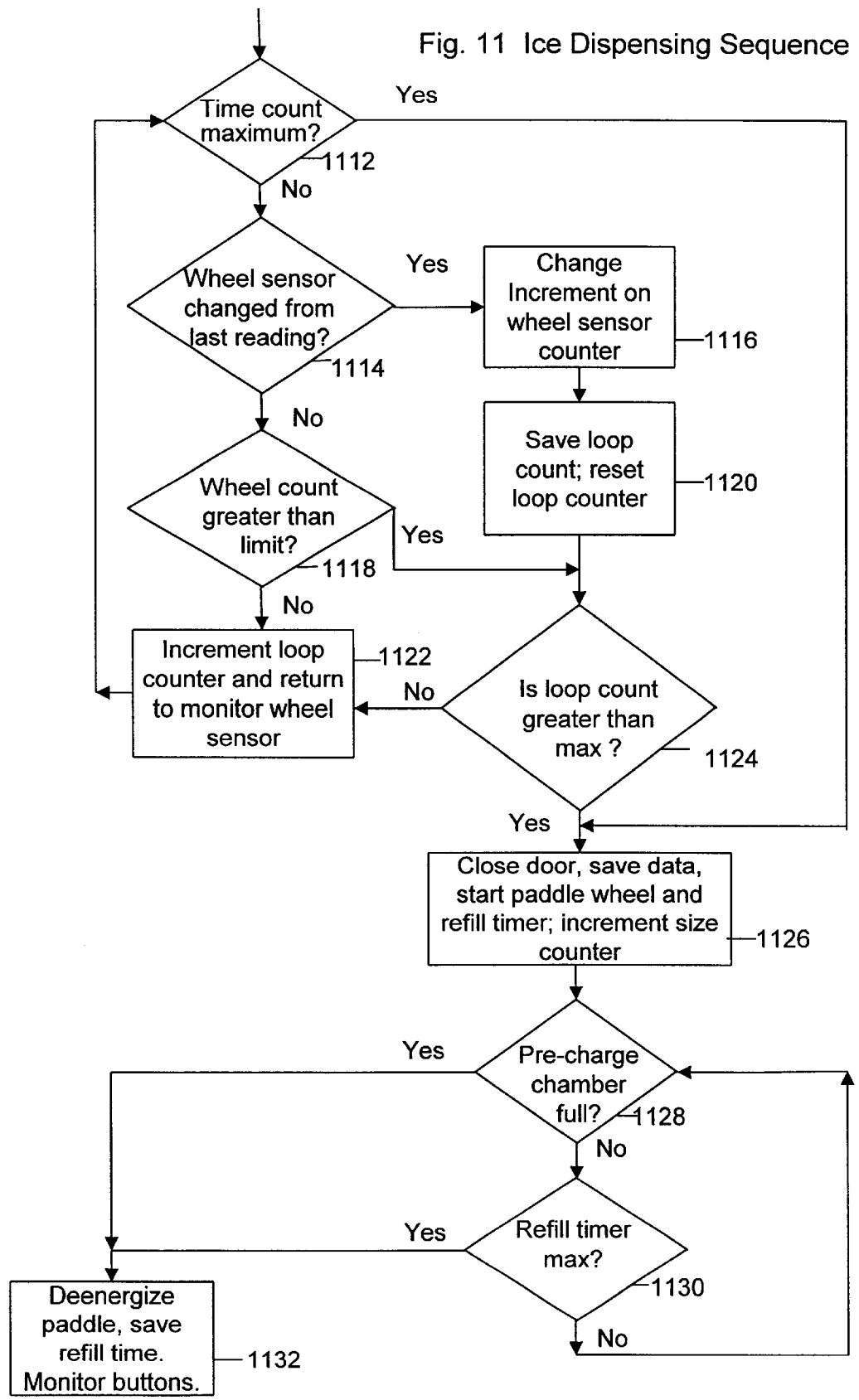
Fig. 11 Ice Dispensing Sequence

VOLUMETRIC ICE DISPENSING AND MEASURING DEVICE

This application claims priority to and the benefit of U.S. Provisional Application No. 60/225,347, Volumetric Ice Dispensing and Measuring Device, filed Aug. 15, 2000, the entire contents of which are hereby incorporated by reference.

FIELD OF THE INVENTION

This invention relates to an apparatus and method for the volumetric measuring and dispensing of ice from a holding bin. The machine is desirably used in an environment for dispensing a high volume of soft drinks of several sizes.

BACKGROUND OF THE INVENTION

Restaurants and food-service establishments with high volumes of beverages need to accurately measure both the amount of beverage and the amount of ice dispensed. Such establishments have ice machines and ice dispensers for this purpose. Ice dispensers typically have a hopper or bin for storing a quantity of ice bodies, desirably in the form of ice cubes, crushed ice, cracked ice or flaked ice. The ice dispenser usually has an agitator in the hopper to prevent the ice from melting into a solid lump. The agitator may also function to force the ice out of the hopper during a dispensing operation through a gate that controls the ice leaving the bin through a dispensing opening. When the gate is opened and the agitator rotated, ice exits the bin, drops down a chute, and is dispensed into a cup. Operation of the dispenser is typically controlled either by a cup-operated lever or a hand-operated button. In a common type of dispenser, ice will pour from the bin for as long as the lever or button is pressed, and the ice flow stops when the button or lever is released.

Other types of ice dispensers are used in establishments with very high volumes, where it is desired to dispense automatically a measured quantity of ice. The dispenser is typically on a timer circuit, such that the timer causes a door or opening to the ice bin to open, and dispensing occurs for a preset period of time in response to actuation of an operating lever or button. Dispensing systems such as these have several advantages, including simplicity, ease of adjustment and the flexibility to accommodate several different ice portions by pressing one of several operating levers or buttons to vary the timed dispensing period. A major disadvantage is that the accuracy with which selected quantities of ice may be dispensed is extremely limited, since the flow rate of ice out of the dispensing gate varies with the amount of ice in the bin, with the orientation of the agitator paddles or blades with respect to the bin opening, and with the speed of rotation of the agitator. There is also a good deal of variation in the flow rate of the ice bodies as they leave the bin, depending on their size, their friction interaction among themselves and with the walls of the bin and dispensing chute, and their temperature. As a result, there can be great differences in the amounts of ice dispensed from one drink to the next, and from one day to the next.

The problem of measuring the flow of solids is a difficult one, even when dealing with "friendly" solids such as grains or powders. Some of the "usual" methods available for storage and flow of solids are simply not appropriate to the problem of moving ice in a fast-paced food service environment. Pneumatic conveyors or conveyor belts are simply not a feasible solution to the flow of ice in a fast-paced food service environment. The many problems that are encountered with the measurement of solids flow usually encourage solutions in the form of secondary measurements, such as the time of flow, or in many cases, load cells on small portions of a conveyor or flow system. While these methods are satisfactory, they may be very expensive, as with a load cell, or subject to other vagaries, such as with a timed cycle. If anything happens to delay the flow, whether of a powder or an ice mass, a timed cycle will not yield an accurate flow.

What is needed is a better way to dispense ice from an ice machine or an ice dispenser in which the volume of ice is measured. What is needed is an ice-dispensing machine that allows a user to select a sized portion of ice over a range of sizes, such as small, medium and large, and which machine will deliver the selected quantity of ice reliably from cup to cup and from day to day.

SUMMARY OF THE INVENTION

The present invention meets this need by a unique metering system in which the volume of ice dispensed is measured while it is being dispensed. A micro-controller receives signals from a volume-measuring device, preferably a wheel placed into a chute through which the ice passes on its way from the ice bin to a cup of a user. When a quantity of ice is desired, a user pushes a switch or a touch pad to select the quantity desired. The machine may be activated by placing a cup into a lever-operator once a quantity is selected. A door to a bin containing the ice opens and ice is funneled from the door down a dispensing chute. As the ice falls down the chute, it bears against and rotates a measuring wheel whose axis is desirably below and outside the chute, and whose working blades extend through the bottom and into the chute. The blades are desirably thin so that they cannot interfere with the movement of ice, but thick enough to resist bending by the ice, even larger particles of ice that may come along from time to time.

The working of the wheel is analogous to the operation of a Roots blower in measuring volumes of gas by causing the rotation of a precision impeller in a pipe of known smoothness and diameter, with a gas stream of known density and with a known pressure drop. By working with known conditions, it is possible to measure the flow of a solid, ice, with reasonable accuracy, by using the same principles. These conditions include an ice bin with a known relationship to an ice dispenser and chute. The flow may vary according to the angle between the ice bin and the ice chute, and the relationship of the door to both. The height of the ice above the door and the chute bears directly on the amount of ice that will pour through the door and down the chute. Other variables include the amount of ice in the bin, the speed of agitation, and the angle of repose of the ice within the bin. Yet other variables will include the size of the door, the size or diameter of the chute, the smoothness or roughness of the chute, the size of the ice flake, ice particle or ice cube conveyed, and the temperature of the system. Preferably, the apparatus allows a user to account and adjust for all these and other variables. After an ice dispensing and measuring apparatus of this invention has been in service, and conditions have changed, or the amount of ice desired changes, the preferred apparatus allows changes to the amount of ice dispensed in a reasonably facile manner.

The rotation of the measuring wheel is captured via an optical or other sensor and correlated to a volume, using the diameter of the chute and the amount of rotation. The weight of the ice may also be used to correlate the amount sensed. The volume is controlled by a microcontroller that compares the volume dispensed with the volume selected. When the volume requirement is met, the microcontroller shuts the door to the ice bin and awaits the next customer.

Another aspect of the invention comprises a method of measuring the flow of a solid through the system described above. The method comprises steps of selecting a predetermined amount of ice, activating a flow of ice through a chute according to the predetermined amount of ice, and stopping the flow of ice when the selected amount has been reached. In another aspect of the invention, the ice dispensing unit has inputs and outputs from the microcontroller and the amount of ice dispensed may be varied, less or more, separately, for each of a plurality of volumes of ice desired, such as a small amount, a medium amount, a large amount, or an extra-large amount.

The invention, its features and its advantages will be further understood upon consideration of the following detailed description of various embodiments of the invention taken in conjunction with the drawings.

BRIEF DESCRIPTION OF THE DRAWINGS

FIGS. 10 and 11 are flow charts of a control scheme of the ice dispenser of FIG. 4.

DETAILED DESCRIPTION OF THE INVENTION

Figure 1:
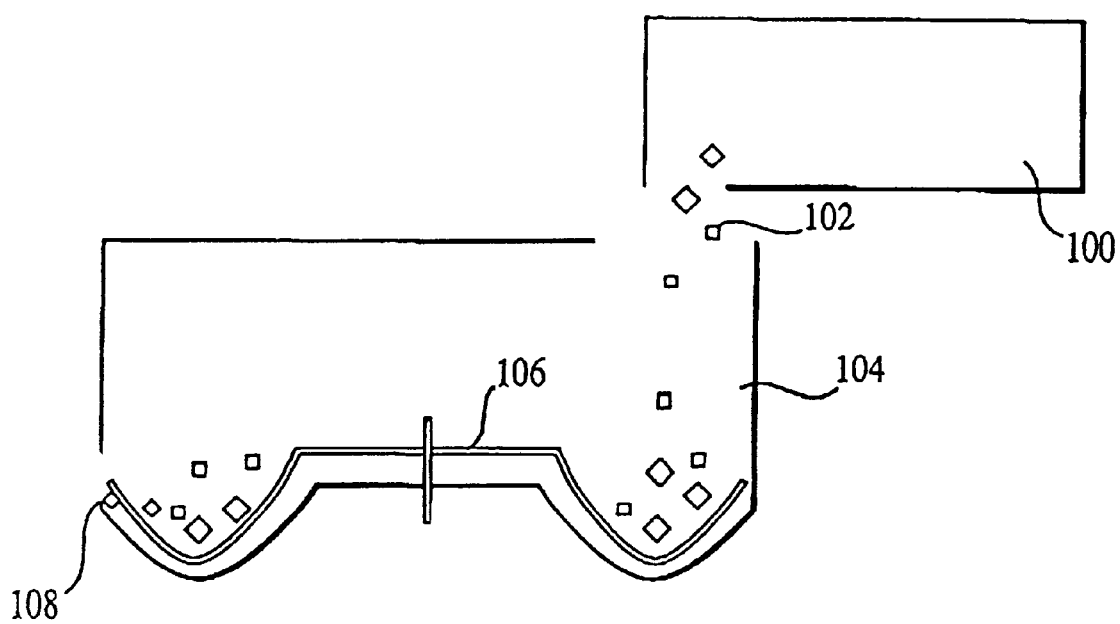
FIG. 1 is a schematic side view of an ice machine with an ice bin.
Figure 2:
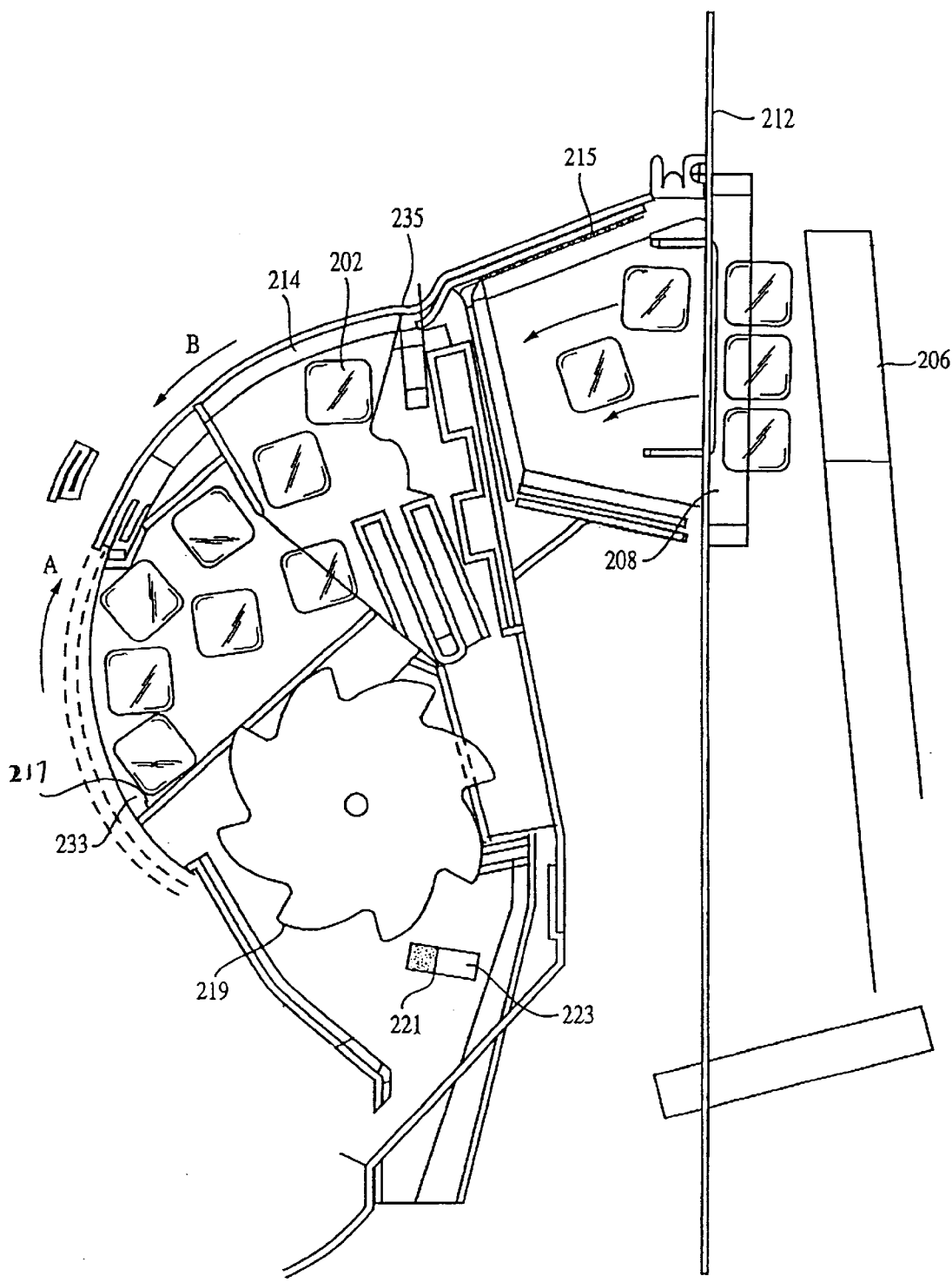
FIG. 2 is a side view of an ice dispenser of the present invention.

FIG. 1 is a side view of an ice machine 100 producing ice 102 and causing the ice to flow into an ice bin 104. The ice bin is typically equipped with an agitator or paddle 106 for moving the ice, breaking up any large masses and insuring that the ice will flow through opening 108, and ice 102 moves through the opening in response to the rotation of paddle or agitator 106. In one embodiment shown in FIG. 2, ice 202 moves from the ice bin 212, propelled by paddle 206 through chute 217 when door 214 is opened. Ice 202 moves through ice bin opening 208 and into an ice loading chamber 233, equipped with a chamber-full sensor 235, when door 214 is moved in the direction of arrow A, to open the door. The chamber-full sensor is connected with wiring (not shown) to a controller of the ice dispensing and measuring system. When the chamber-full sensor senses that the chamber is full, it sends a signal to the agitator or paddle to cease.

The door itself is not between the wheel 219 and the paddle 206. The door is located below but close to wheel 219, and ice is queued in the chamber above the wheel, ready for dispensing. Ice is also stored in chute 217. Chamber 233 is located below ice bin opening 208, which allows gravity to move ice into the chamber as the agitator causes the ice to move through the ice bin opening. When a user wants ice, the door opens in the direction of arrow A, ice tumbles down chute 217, causing measuring wheel 219 to rotate in accordance with the volume of ice flowing through the chute. The rotation of the wheel is captured by sensor 221 and conveyed by electrical wiring 223 to a control board or control system (not shown). The chute is preferably tubular in shape and circular in cross-section.

The queuing chamber 233 allows for a fast filling of ice by a user. In one embodiment, it takes about 5 seconds to fill an empty queueing chamber. In one embodiment, the chamber need not be refilled before the dispenser allows dispensing of a portion of ice to the next user. If the queueing chamber chamber. In one embodiment, the chamber need not be refilled before the dispenser allows dispensing of a portion of ice to the next user. If the queueing chamber contains less ice than the size requested calls for, the door remains open and the wheel measures the ice as it falls through the chamber, until the sensor detects that the amount requested has been satisfied.

The working of the wheel is analogous to the operation of a Roots blower in measuring volumes of gas by causing the rotation of a precision impeller in a stream of known density and known pressure drop. A Roots blower thus measures volume by counting the number of rotations, each rotation of an impeller delivering a known quantity of gas. Another analogy is that of a star feeder used to convey and measure the flow of solids from a bin or silo, as in fungible grain or powders, such as inorganic chemicals or plastic pellets. Each rotation of a star feeder displaces the volume of the star in the rotation of the feeder. A star feeder is also known as a rotary valve. While complicated devices such as star feeders or rotary valves are not necessary for ice dispensers, there remain problems in dispensing and measuring.

In this application of measuring the ice as it traverses a chute and turns the paddles of a wheel, the device is not strictly measuring the volume of ice. There is no way to insure that the chute is packed full every time, or for that matter, to ensure that ice is dispensed every time. Thus, the device is not strictly measuring the volume of ice, but rather a surrogate or stand-in for that volume. For instance, the agitator of the ice bin sends ice through the door to the chute. If the door is at such a height that ice travels in the top half of the chute, the volume of ice "measured" by the paddle wheel will be about twice the ice actually delivered. That is, the ice does not completely fill the chute, but the measuring wheel will rotate just as though it were full of ice. Thus the wheel may measure about twice the actual amount of ice delivered. Instead of the proper measurement, x lbs of ice, this system may measure x lbs of ice. Thus, our surrogate measurement here may be 2x the actual amount. This is taken account of when the machine is set up for customer use. Other embodiments may use the weight of ice delivered to calibrate the amount of ice delivered. The I/O pad provides a way for a serviceman or owner to adjust the quantity of ice selected, as described below in the section on the control system. It should be kept in mind that no claim of an accurate quantity is made, but rather the dispenser uses a surrogate or stand-in for the actual volume of ice dispensed. This is the meaning of a "predetermined amount."

The present invention achieves the necessary measuring without interfering with the dispensing of ice described above. When the ice dispenser is activated by pressing a button, the door opens. Ice is free to pass through the opening in an ice bin, into the ice chamber, down the chute and through the door into a cup of a user. A measuring device that interferes with the flow is not desirable. Therefore, the device or wheel should rotate freely and reliably, neither interfering with ice movement nor slowing it down. In terms of geometry, the wheel should protrude through the bottom of the chute a distance sufficient to rotate the wheel as the ice slides down the chute. In one embodiment, the chute is about 3" in diameter and is about 6" long. The measuring wheel is about 3" in diameter, and protrudes through the bottom of the chute about ¾ of an inch. The wheel is made of metal or of plastic approved by the National Sanitary Foundation (NSF) for food service and is about ⅛" wide. The wheel is mounted on an axis external to the ice bin and its bearings are desirably of the sealed, self-lubricating variety. In other embodiments, the wheel is from about 1/16" wide to about ¼" wide. The wheel should freely rotate on its axis in response to the movement of ice. The chute preferably has a circular cross-section. This is not strictly necessary for operation, but a circular cross section is better able to conduct flow of solids, such as ice, than a different cross-section. In a circle, there are no corners to obstruct the flow of cubes or chunks of ice. Even though the ice may catch on the sides of the circular chute, the obstruction will not be as great as that encountered, for example, in a square or hexagonal-shaped conduit.

The rotation of the wheel is captured by a sensor positioned to observe pulses of light broken by teeth of the wheel. Alternatively, dark spots or gaps may be placed in or on the wheel so that an optical sensor will be able to detect rotation of the wheel by observing changes in a light path. Another method that may be used is to drill holes through the wheel at a particular radius so that the sensor "sees" the difference between light and dark as the light penetrates the holes but does not penetrate the wheel where it is not drilled. Other sensor embodiments may include proximity or inductive or capacitive sensors. In an embodiment using proximity sensors or Hall-effect sensors, a magnetic field detects motion of magnetic substances moving through the field, such as teeth of a gear or paddles of a wheel, as would be observed with a metallic wheel or one with magnetic qualities or objects placed upon it. These types of magnetic sensors are desirably used with metal wheels rather than plastic ones. Inductive sensors or capacitive sensors are also potentially useful for detecting rotation of the measuring wheel, by electrical or electromagnetic phenomena. The optical sensor, however, works best in tests conducted to date.

There may be other ways to measure the flow of ice volume or ice mass, such as putting a light beam through the chute itself. In this case, each cube of ice would break the beam and register with an optical sensor. However, the size of ice chunks or cubes may itself vary, so even counting cubes is not a guarantee of accuracy. Proximity sensors will not be effective because they tend to detect metallic objects, and such sensors will not detect ice. Other shortfalls may be found in almost any alternative scheme of measuring, such as timing or other methods.

Figure 3:
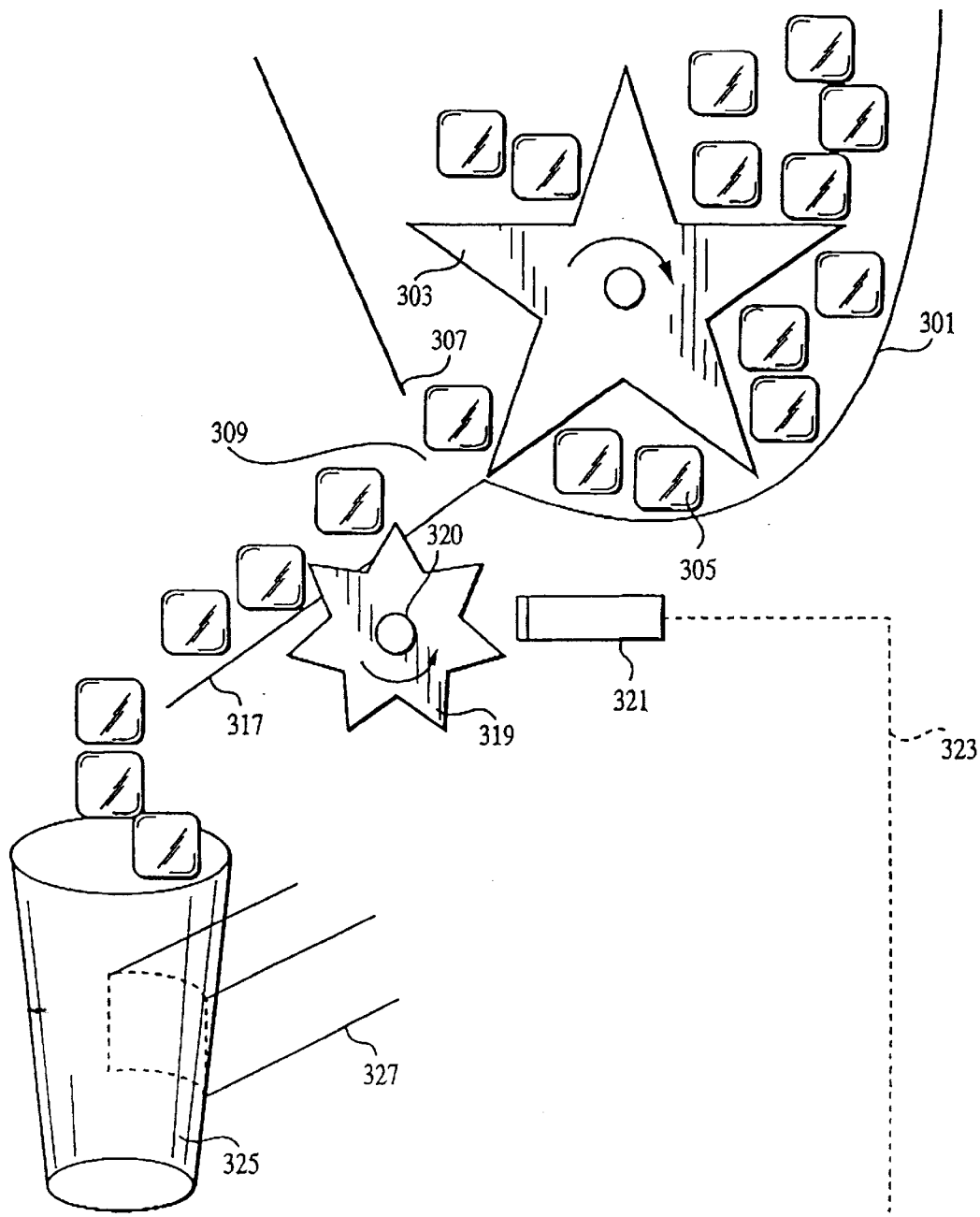
FIG. 3 is a schematic view of a second embodiment of an ice dispenser of the present invention.

A representation of another ice dispensing apparatus of the present invention is shown in FIG. 3, in which the ice bin 301 employs a paddle agitator 303 to move ice 305 from ice bin 301. In this embodiment, feeder door 307 funnels ice 305 through opening 309. Ice tumbles down the chute 317, causing rotation of the measuring wheel 319 on its axis 320. The movement of the wheel is picked up by sensor 321 and relayed by wiring harness 323. Here, a cup 325 placed against cup locator 327 may also serve to activate the ice dispenser to dispense a quantity of ice. Alternatively, a user may push a button or toggle a switch to select an amount of ice associated with a particular size of cup.

Figure 4:
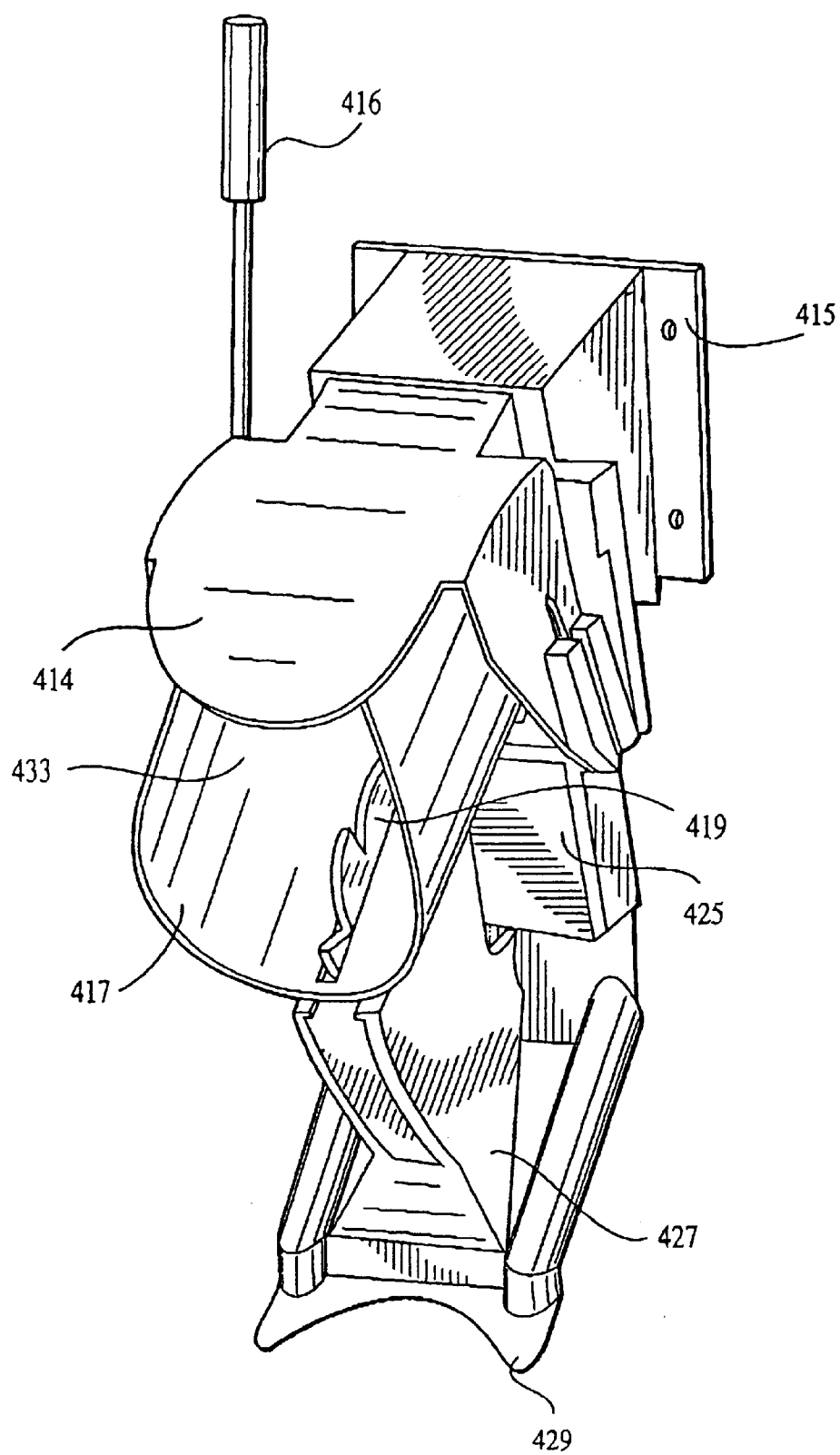
FIG. 4 is a perspective view of a third embodiment of an ice dispenser according to the present invention.

Another embodiment is shown in FIG. 4, in which the dispenser includes an attachment portion 415, such as a mounting flange, for attaching to an ice bin. The attachment 415 leads from an ice bin to an ice chute 417 via chamber 433. The door 414, shown open, is opened to dispense ice or closed to stop the flow of ice, in response to an actuator 416 responding to commands from a controller activated by a user of the ice dispenser. A measuring wheel 419 protrudes through the bottom of the chute where a sensor (not shown) captures its rotation and relays a signal through a wheel rotation sensor module 425. Sensor module 425 may receive signals from a sensor detecting rotation of the wheel. The sensor or the module may then send an amplified or enhanced signal to a microprocessor controller to control the volume flow of the ice so measured, by closing the door 414. The dispenser also includes a drain 427 and a cup locator 429. The drain, while not essential for the operation of the measuring wheel, is useful for draining away water from melting ice that accumulates from small quantities of ice trapped in chamber 433 or chute 417.

In one embodiment of the invention, the door actuator is controlled by a solenoid (not shown) operably connected to a control system of the ice dispenser. The solenoid operates a gas valve that allows a gas-operated actuator to open the door of the ice dispenser. Gases that are used should be those that are not dangerous to humans in a restaurant or food-service situation. The gases should also not be harmful to food or drink, and preferably include air, nitrogen and carbon dioxide.

Figure 5:
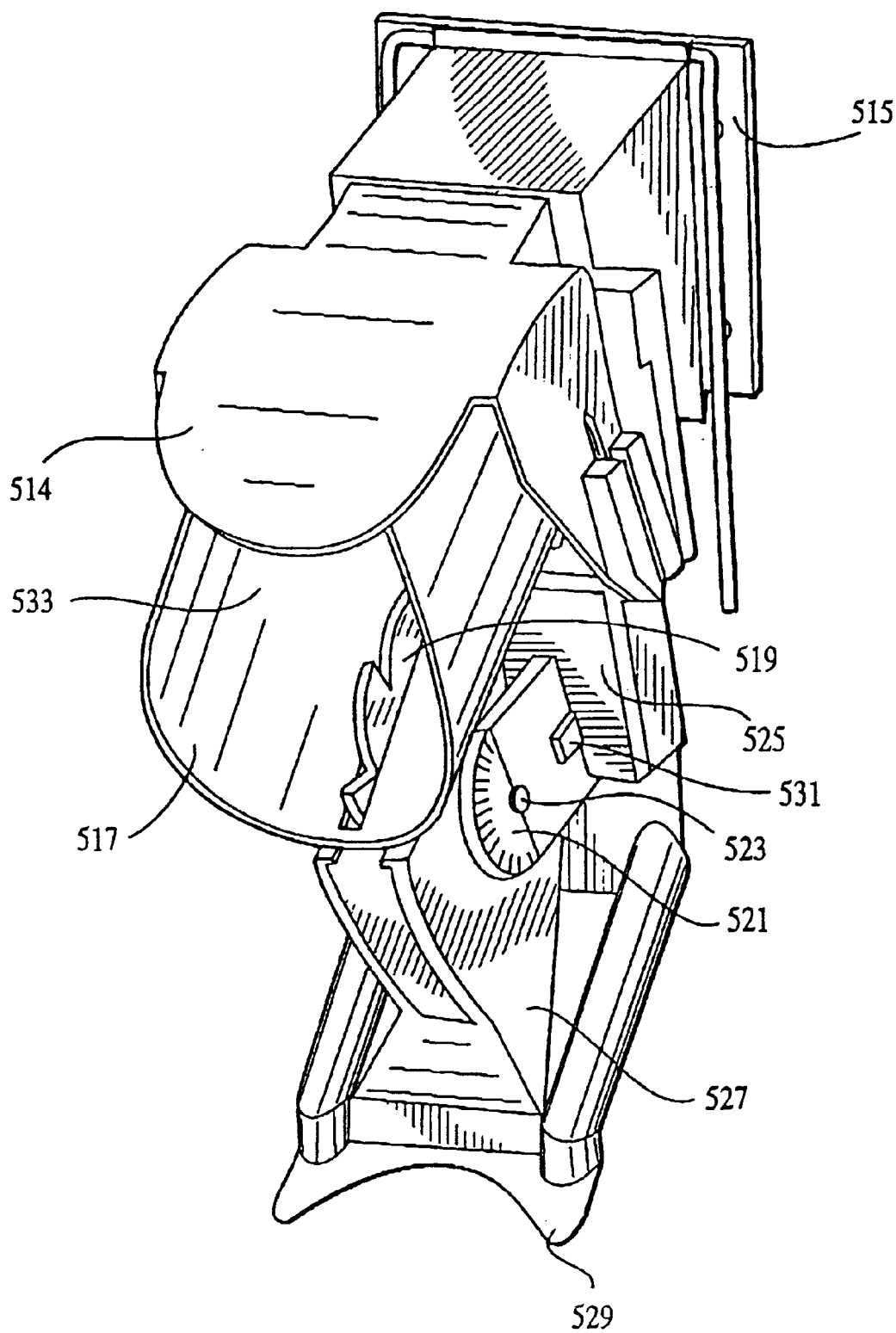
FIG. 5 is a perspective view of a fourth embodiment of an ice dispenser according to the present invention.

FIG. 5 depicts an alternate embodiment of an ice dispenser, in which the ice wheel 519 is mounted on shaft 523 with a second wheel 521 mounted outside the chute 517. The second, outer wheel 521 is mounted so that it rotates in tandem with the inner wheel 519. As the wheels rotate, a sensor 531 may capture the rotation of the outer wheel, and thus control the operation of the ice dispenser. The sensor may send its output to sensor module 525 for relaying to the ice dispenser controller (not shown). Other portions of the ice dispenser remain, include a mounting portion 515, door 514, chute 533, drain 527 and cup locator 529.

Figure 6:
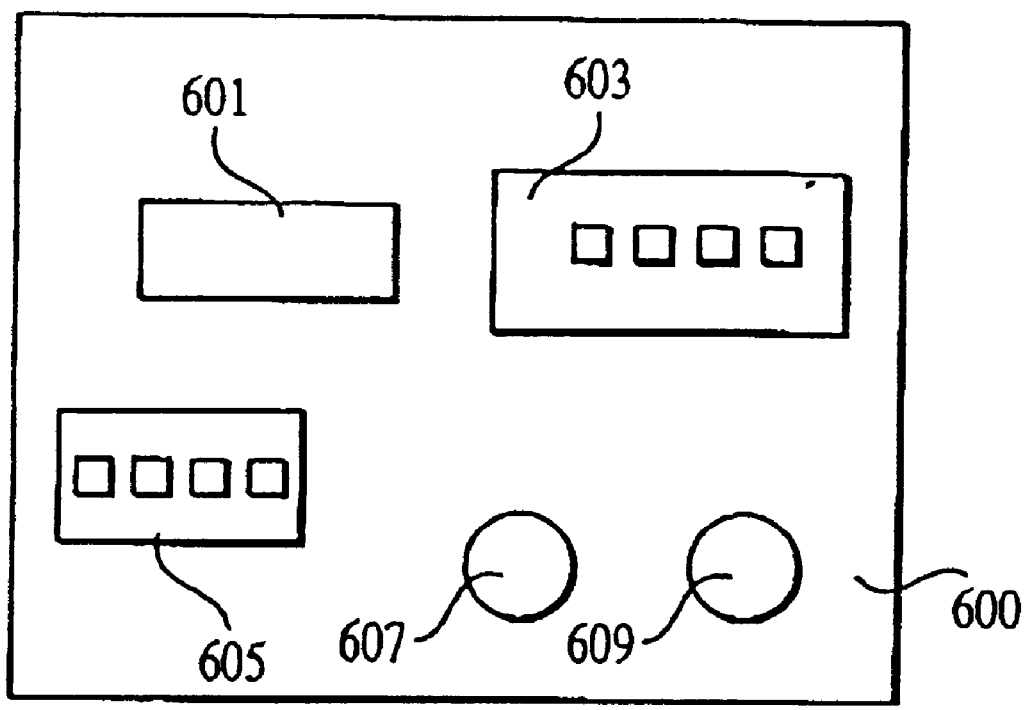
FIG. 6 is a front view of a control panel for the ice dispenser of FIG. 4.

The ice dispenser is useful because it allows a user to select from a plurality of quantities of ice for automatic dispensing. Once the user selects the desired quantity, the machine is activated to dispense that quantity. In one embodiment, the ice dispenser is constructed so that a user may select from one of four pre-determined quantities of ice, including, but not limited to, small, medium, large and extra large. In another embodiment, the ice dispenser is constructed so that a user may select from one of three predetermined quantities of ice. The number of quantities is reflected in the construction of a control panel used in one embodiment, and as shown in FIG. 6. Control panel 600 is mounted on an ice machine or a soda-dispensing machine, and the portion shown in FIG. 6 is that portion used to control the flow of ice to a beverage or to a beverage cup. The panel includes a display 601, such as an LCD display or a CRT display, in order to set the quantities of ice to be dispensed automatically. I/O keypad 603 provides inputs and outputs to the control panel and to a controller or microprocessor (not shown).

Exemplary of the four buttons shown in the figure are "input", "enter", "up" and "down". While exemplary, the invention is not limited to these particular embodiments, and others may be used, including an entire 10- or 12-member keypad or even a keyboard. Ice portion keypad 605 depicts four buttons corresponding to the four sizes of drinks, or quantities of ice, mentioned above. While this embodiment uses a plurality of four, more quantities or less may also be used. In addition, it is desirable for the dispenser to be able to switch the automatic feature on and off, and a toggle switch 607 may be provided for that purpose. If the automatic feature is turned off, a manual dispenser control 609, such as a switch or a button, is desirably provided.

In this embodiment, a user may select one of the four sizes of ice by pushing the appropriate button in ice portion keypad 605. The machine may be set up to dispense ice when the button is pushed, or the machine may require the user to satisfy an interlock switch (not shown) closed by pushing a cup against a cup locater (shown in FIGS. 4 and 5), before ice will dispense. In either case, the dispenser then dispenses the amount of ice corresponding to the setting associated with the button. In another method of operation, a user may toggle switch 607 for manual dispensing, and pushing button 609 will then cause a door of the dispenser to open and dispense ice until the button is released.

In another embodiment, there may only be a single button to signal the dispenser to dispense ice, and an alternative means to select the amount desired from among a group of two or more amounts. These alternative means may be a touch pad in which a numeral from 1 to 4 is selected, or a specific size is selected from among a plurality of sizes. An ice dispensing and measuring machine may also feature for customers or users a wheel that rotates among the numerals 1 to 4, or among a plurality of sizes, to select the desired amount. The invention includes these alternative embodiments.

Figure 7:
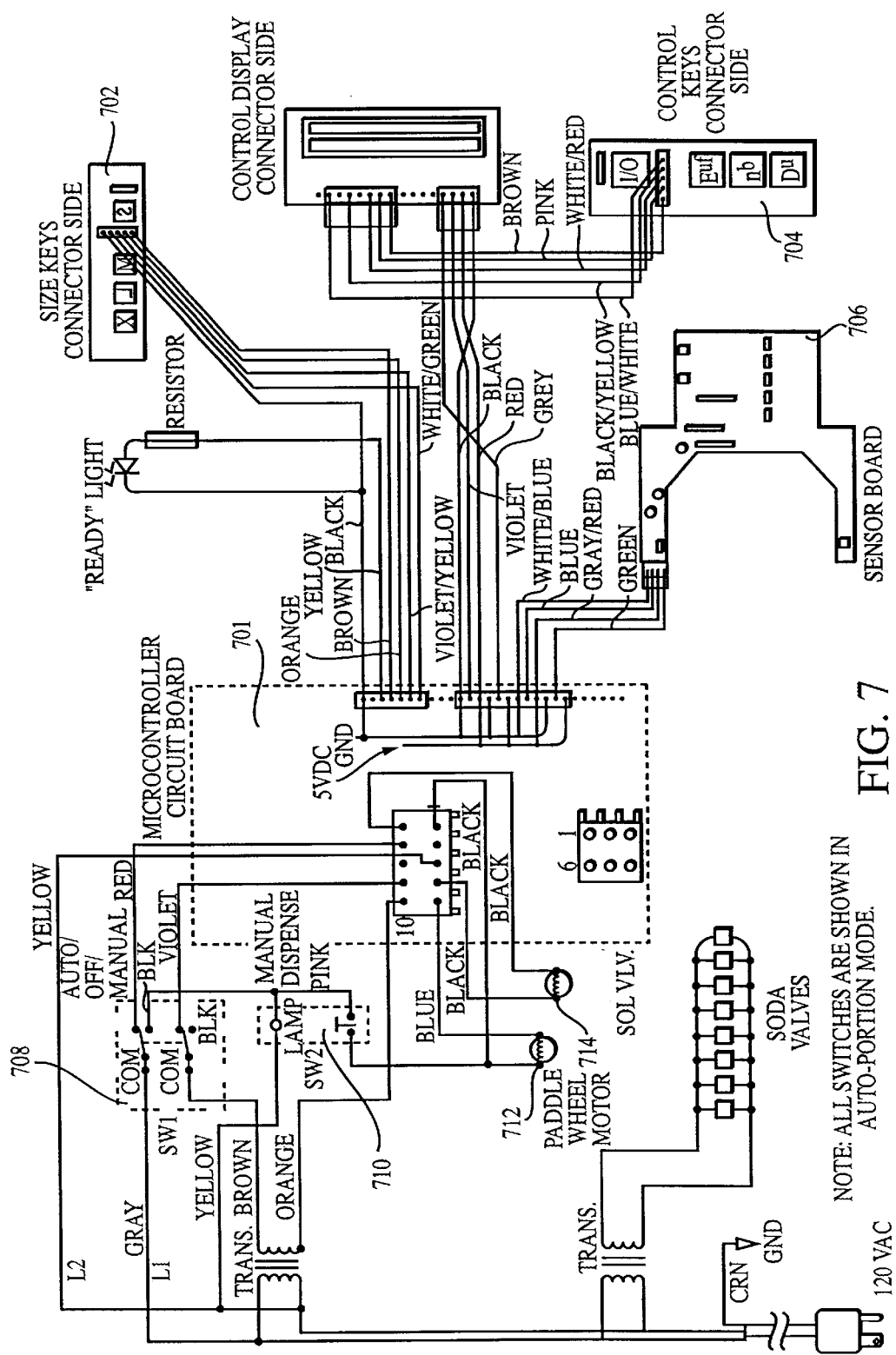
FIG. 7 is an electrical schematic of controls used for the ice dispenser of FIG. 4.

In one embodiment, a control system, such as depicted in FIG. 7, is used to control the ice dispenser. The controller need not have its own housing, but may be enclosed as part of a soft-drink dispensing machine. Alternatively, a control system may be housed in a housing that includes the control panel depicted in FIG. 6. The control system comprises a controller or microcontroller, such as a microprocessor 701 or a digital signal processor. The control system receives inputs from the keypad 702, input keys 704 and from other parts of the ice dispenser, such as the wheel sensor and the chamber full sensor of the ice dispenser, the toggle switch 708 for manual/automatic operation, and a manual dispense button 710. The sensor inputs may first be routed to a sensor board 706 for conditioning or ease of routing. The control system will control outputs to the paddle wheel motor 712 and the door control solenoid 714 of the ice bin, allowing the paddle wheel or agitator to turn and controlling the opening of the door.

Input keys 704 may be used for setting or adjusting the amount of ice for each particular quantity selected, such as small, medium, large or extra-large. The microcontroller will use those settings to command the door to the ice bin to open until the wheel sensor is satisfied that the correct quantity of ice has been dispensed. At that point, the door to the ice bin will close and dispensing of ice will cease until the next user begins another cycle. In another embodiment, the cup locater acts as an interlock for the ice dispenser system. In this embodiment, a user selects and pushes a button for a predetermined amount of ice. However, the control system does not send a signal to the ice door to open until an interlock operably connected to the cup locater is closed. This will help to prevent spills that may occur when a user pushes a selector button but neglects to place a cup or container to receive the ice.

Figure 8:
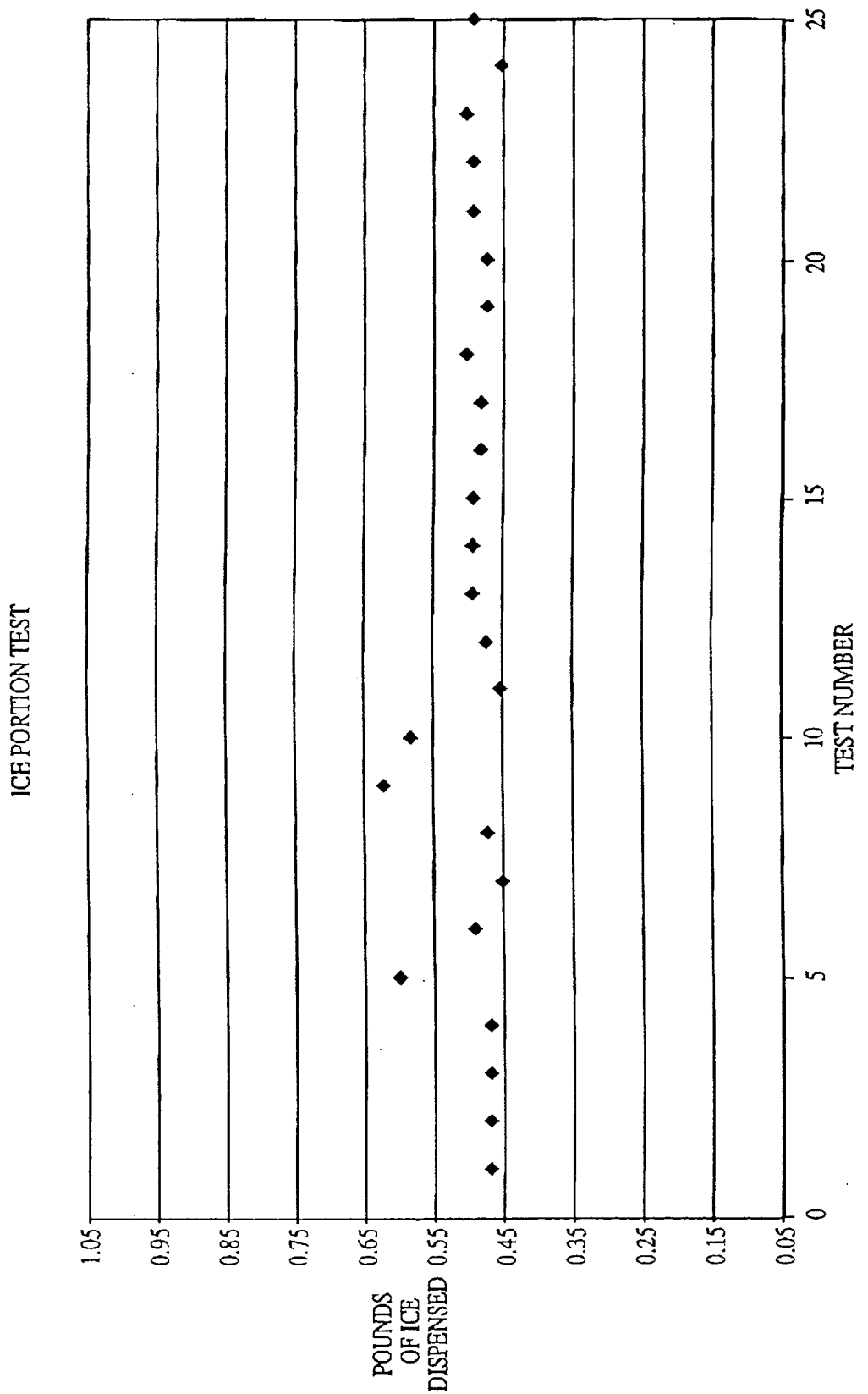
FIG. 8 is a graph of test results.

In one embodiment, an optical sensor notes the gaps between the "paddles" or "teeth" of the measuring wheel as it rotates while dispensing ice. In one example, a quantity of ice is determined to require 80 (eighty) interruptions of a light beam between the paddles to dispense the correct amount of ice. In a test, several runs at this setting are determined to yield less than the desired quantity of ice. Therefore, the I/O pad is used to increase (in this example) the number of interruptions required to yield the desired quantity of ice. The new setting is entered into the microcontroller through the I/O pad and further tests are run. When this setting is satisfactory, the other settings are similarly adjusted. In one series of tests, the amount of ice was measured in twenty-five successive draws for portions of ice. The results are depicted in FIG. 8.

Figure 9:
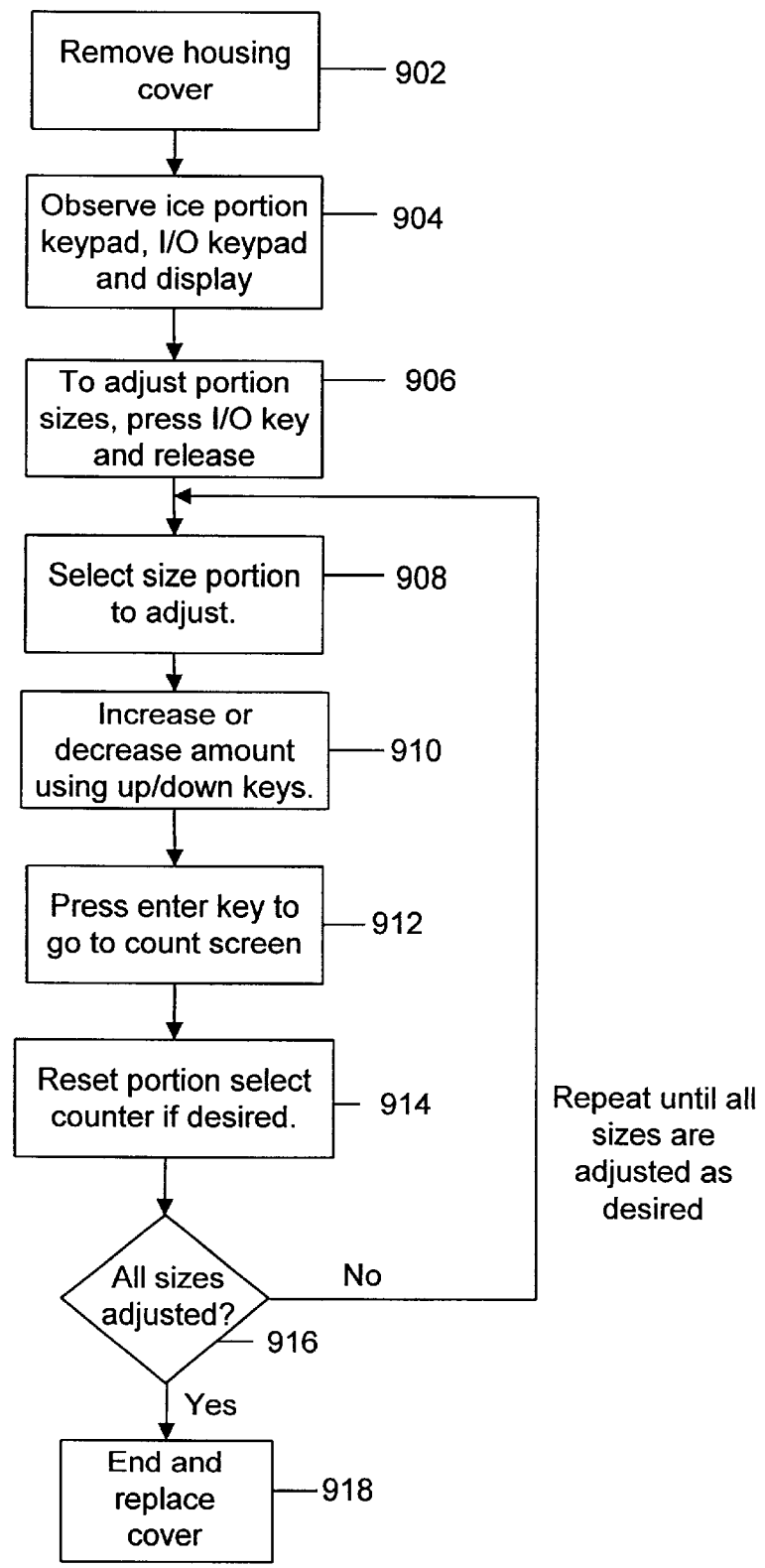
FIG. 9 is a flow chart for setting the amount of ice dispensed from the dispenser of FIG. 4.

FIG. 9 is a flow chart depicting how a user adjusts the ice machine to dispense a set amount of ice for each size cup. Typically, an ice-dispensing machine has its electronics protected in a housing, and a housing cover must first be removed 902 to access the internal controls. A serviceman then observes the ice control display 904, including a display 601, an I/O keypad 603, and an ice portion keypad 605. In one embodiment, an "I/O" key may be depressed and released 906 to set up size adjustment. A size to be adjusted may then be selected by depressing or switching the desired size 908 from the ice portion keypad. If the I/O keypad has "up" and "down" keys, the appropriate adjustment is then made 910. In one embodiment, the adjustment is entered by depressing an "enter" key on the I/O keypad 912. If the ice dispenser has a circuit to count the number of drinks dispensed, this may be a convenient time to reset the counter if desired 914. When the ice amount has been adjusted on all sizes desired 916, the sequence may be ended 918 and the cover replaced.

In another embodiment, the ice dispensed from the ice bin does not proceed directly to a chute, but rather to a storage area between the door to the chute and the ice bin. This vestibule or chamber enables the ice dispenser to quickly send ice down the chute when a user pushes a control button or activates the machine. A drain, as shown in FIGS. 4 and 5, helps rid the chute of melted ice and keeps the passageway clear of obstacles. A further advantage of both the chamber and the chute is that they may be filled loosely with ice by the action of a paddle or agitator in the ice bin. Thus loosely packed, an amount of ice is ready for dispensing when a user activates the dispenser.

One advantage of the chamber and the chute is that portion serving time for the several sizes of ice may be very fast, as low as 0.3 seconds for each portion. This is a considerable achievement in a machine that allows selection of serving sizes from 0.1 to 0.2 pounds in a small size, up to almost an entire pound of ice, 0.9 pounds, in an extra-large size. Furthermore, the chamber, by allowing pre-filling in the time between users, minimizes the time each user must spend waiting for a portion of ice. The chute and chamber arrangement also provides better accuracy in terms of consistency of the amount of ice served from customer to customer, as little as 15% variation or better. Lastly, the motion of the ice through the chute is first in-first out, preventing coagulation of the ice in the chute.

Figure 10:
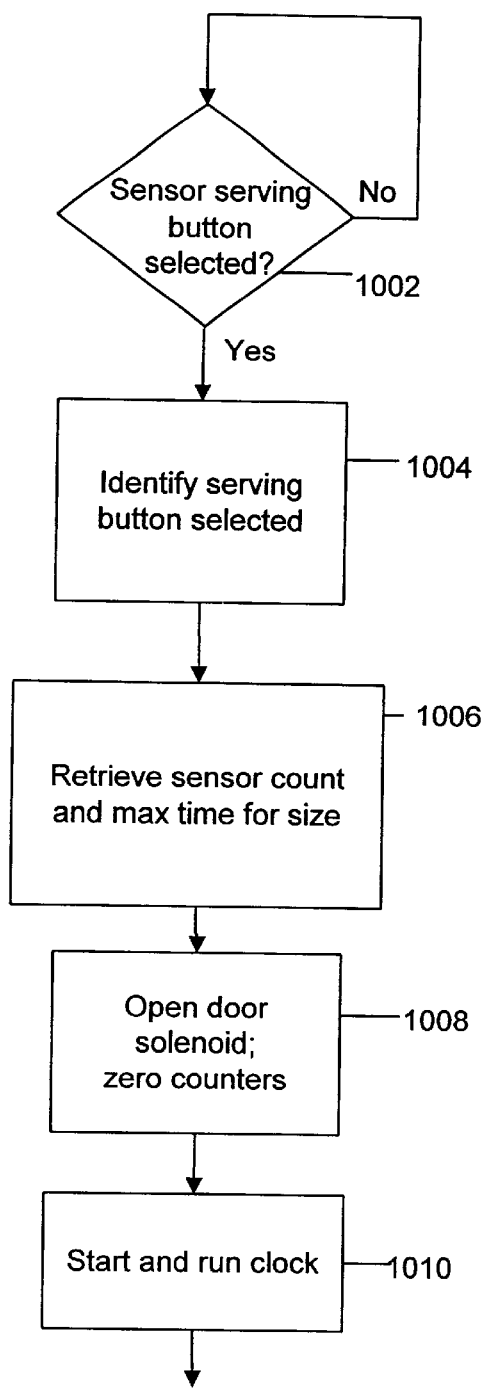

FIGS. 10 and 11 are flow charts depicting the operation of the ice-dispensing machine. A user approaches the machine and selects one of the size selection buttons or switches, thus selecting an amount of ice to be dispensed 1002. The control system detects the fact that a serving size button has been selected 1002 and the microprocessor controller identifies the serving size selected 1004. The microprocessor controller then retrieves the appropriate sensor count for the selected size 1006 and may also begin a timer for limiting the ice dispensing to a maximum amount of time for safety purposes. The controller then opens the ice door by means of a solenoid or other actuation device 1008 and zeroes the counters for the volumetric ice dispensing and measuring device. At that point, the timer begins timing the length of time the door is open 1010.

FIG. 11 then begins with a comparison 1112 of whether the timer count has reached a maximum. If the timer has not reached its maximum time, the control system queries whether the wheel sensor has detected any change from its last reading 1114. This comparison will generally detect only integral changes in the wheel rotation, i.e. an integral measurement, tooth by tooth. If there has been no change, and the wheel count or tooth count is less than the count appropriate for the serving size selected 1118, the ice door stays open and the controller loops back to re-check whether the time elapsed has exceed the maximum time limit set as an alternative to the wheel sensor count. If the wheel sensor has changed from its last position, a wheel sensor counter will increment its change 1116 and record the number of program loops between teeth or other interval used to measure ice volume 1120. Each time the wheel sensor increments, the number of loops through 1116 between wheel sensor or teeth increments is saved, and the loop counter is reset.

Embodiments are not limited to integral intervals, such as integral spokes or teeth of a wheel. The controller may also use fractions of intervals based on the loops through a sequence such as that depicted in FIG. 11. As an example, a particular ice serving size may call for 12.6 sensor tooth signals or intervals. In this example, the number of program loops between count 11 and 12 may be 40 program loops, through either the loop beginning with 1114 or the loop beginning with 1116. In the example of 12.6 sensor teeth, 0.6 sensor teeth would be about 24 loops through the sequences depicted. The loop comparator 1124 will eventually detect the desired number of loops, if the time count does not first reach its limit 1112 first.

When the time count is at its limit 1112, or when the wheel count has reached its limit 1118 and the sensor loop counter has reached its limit 1124, the control system will activate sequence 1126. The controller will then close the ice door, save the data monitored above, begin rotation of the paddle wheel in the ice storage bin to fill the ice chamber, and will also increment the count on the serving size counter. If the ice dispenser has a sensor for detecting a chamber-full condition, the paddle wheel may run until the sensor detects such a condition 1128. If there is no sensor, or the sensor is inoperative, a timer may be used to time the sequence for filling the pre-charge chamber 1130. In either case, when the chamber is full or the allotted time has elapsed, the control system will activate sequence 1132. Alternatively, the controller may be instructed to deactivate the paddle wheel when a certain number of revolutions of the paddle wheel have been reached. At that point, the controller will de-energize the paddle and save the time or the number of rotations required to refill, if so desired. The control system may then return to monitoring the service size buttons, and the process of FIGS. 10 and 11 begins again. Operating parameters may be recorded or saved for later diagnostic or analytical purposes.

There are many ways to practice this invention. As an example, the discussion above has focused on four cup sizes. The method may be used for a single cup size, or for two sizes, or for three, or for more than four. The figures depict small ice cubes, while the ice measuring and dispensing device will work as well with flaked ice or crushed ice, so long as the ice does not melt and agglomerate. Accordingly, it is the intention of the applicants to protect all variations and modifications within the valid scope of the present invention. It is intended that the invention be defined by the following claims, including all equivalents. While the invention has been described with reference to particular embodiments, those of skill in the art will recognize modifications of structure, materials, procedure and the like that will fall within the scope of the invention and the following claims.

We claim:

1. An apparatus for dispensing ice from an ice bin, comprising:
    a) a chute connected to the ice bin;
    b) a door connected to the chute;
    c) a first wheel having an outer portion that protrudes into the chute;
    d) a control system for controlling operation of the door coupled to the first wheel; and
    e) at least one selector for selecting an amount of ice, operably connected to the control system,
        wherein activation of the selector opens the door, allowing ice to flow down the chute, and wherein ice flowing down the chute causes rotation of the wheel, which indicates to the control system the amount of ice flowing, and after a predetermined amount of ice has flowed in accordance with the at least one selector activated, the control system causes the door to close.

2. The apparatus of claim 1, further comprising an actuator operably connected to the door and controlled by the control system to open and close the door.

3. The apparatus of claim 2, wherein the actuator is a gas-operated actuator.

4. The apparatus of claim 1, further comprising a sensor for measuring rotation of the first wheel, the sensor operably connected to the control system.

5. The apparatus of claim 4, wherein the sensor is an optical sensor.

6. The apparatus of claim 4, wherein the wheel is mounted on an axle, and further comprising a second wheel outside the chute mounted on the axle, and wherein the sensor measures the rotation of the second wheel.

7. The apparatus of claim 1, further comprising a cup locator operably connected to the control system, wherein actuating the cup locator sends a signal to the control system, and the apparatus dispenses a predetermined amount of ice.

8. The apparatus of claim 1, wherein the control system comprises a microcontroller, an interface for receiving signals from the at least one selector, an interface for receiving signals caused by rotation of the wheel, and an interface for sending a signal to close the door.

9. The apparatus of claim 1, wherein the selector comprises a number of buttons selected from the group consisting of one, two, three, four and five buttons.

10. The apparatus of claim 1, wherein there is one selector and the predetermined amount of ice is selected by manipulating a variable input to the control system.

11. The apparatus of claim 1, further comprising a space between said door and said ice bin.

12. The apparatus of claim 1, combined with an ice bin having an agitator operably connected to the control system.

13. The combination of claim 12, further comprising a space-full sensor for monitoring a space between the door and ice bin, and operably connected to the control system to operate the agitator.

14. The apparatus of claim 1, wherein activation of the selector also activates the apparatus.

15. A method of dispensing a predetermined amount of ice, comprising:
   a) selecting a predetermined amount of ice;
   b) activating a flow of ice through a chute;
   c) measuring a volume of ice as the ice flows through the chute; and
   d) stopping the flow of ice when the predetermined amount has been reached.

16. The method of claim 15, wherein the step of selecting a predetermined amount of ice is accomplished by pushing at least one selector button.

17. The method of claim 15, wherein the step of activating the flow of ice is accomplished by using an actuator to open a door.

18. The method of claim 17, wherein the actuator is a cup locater.

19. The method of claim 15, wherein stopping the flow of ice is accomplished by closing a door.

20. The method of claim 15, wherein the volume of ice is measured with a wheel in the chute and a sensor, wherein the flow of ice causes the wheel to turn and be detected by the sensor.

21. The method of claim 20, wherein the sensor is an optical sensor and the amount of ice is measured as a function of its volume by the sensor counting pulses of light as the wheel rotates.

22. The method of claim 15, where the step of stopping the flow of ice is accomplished by comparing the volume of ice that has flowed through the chute to the predetermined amount.

23. The method of claim 15, wherein the measured volume of the ice is compared to the predetermined amount using at least one of a density of the ice, a fraction of the volume of the ice, and a factor multiplied by the volume of the ice.

\* \* \* \* \*